US009424065B2

(12) United States Patent
Singh et al.

(10) Patent No.: US 9,424,065 B2
(45) Date of Patent: Aug. 23, 2016

(54) METHODS AND APPARATUS TO SCALE APPLICATION DEPLOYMENTS IN CLOUD COMPUTING ENVIRONMENTS USING VIRTUAL MACHINE POOLS

(71) Applicant: VMWARE, INC., Palo Alto, CA (US)

(72) Inventors: Servesh Singh, Bangalore (IN); Kiran Singh, Bangalore (IN); Shyam Mankala, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/453,701

(22) Filed: Aug. 7, 2014

(65) Prior Publication Data

US 2015/0378765 A1   Dec. 31, 2015

(30) Foreign Application Priority Data

Jun. 26, 2014   (IN) .......................... 3116/CHE/2014

(51) Int. Cl.
   *G06F 9/455*   (2006.01)
   *H04L 29/08*   (2006.01)
   (Continued)

(52) U.S. Cl.
   CPC .......... *G06F 9/45558* (2013.01); *G06F 3/0482* (2013.01); *G06F 3/04842* (2013.01); *G06F 3/04847* (2013.01); *G06F 9/50* (2013.01); *H04L 47/70* (2013.01); *H04L 67/10* (2013.01); *G06F 8/61* (2013.01); *G06F 2009/4557* (2013.01); *G06F 2009/45575* (2013.01); *G06F 2009/45595* (2013.01)

(58) Field of Classification Search
   CPC .................................................. G06F 9/45558

USPC ....................................................... 718/1-108
See application file for complete search history.

(56) References Cited

U.S. PATENT DOCUMENTS 8,065,676 B1 *  11/2011  Sahai ..................... G06F 9/5077
                                                        709/226
8,261,295 B1 *  9/2012   Risbood .................... G06F 8/61
                                                         717/177

(Continued)

OTHER PUBLICATIONS

Chieu, T. C., Mohindra, A., Karve, A., & Segal, A. (Oct. 2009). Dynamic scaling of web applications in a virtualized cloud computing environment. In e-Business Engineering, 2009. ICEBE'09. IEEE International Conference on (pp. 281-286). IEEE.*

(Continued)

*Primary Examiner* — Satish Rampuria

(57) ABSTRACT

Methods and apparatus are disclosed to scale application deployments in cloud computing environments using virtual machine pools. An example method disclosed herein includes displaying a user-selectable control to specify whether the application is to be scaled in accordance with a scaling policy, based on selection of the user-selectable control, storing, in a blueprint of the application, an indication of whether the application is to be scaled in accordance with the scaling policy, based on the indication in the blueprint, preparing a virtual machine pool in the computing environment, the virtual machine pool including a virtual machine provisioned for use in a scaling operation, in response to a request to scale the application deployed in a deployment environment, determining whether configuration information satisfies a scaling requirement, and based on the determination, performing the scaling operation in accordance with the request to scale by transferring the virtual machine to the deployment environment.

27 Claims, 8 Drawing Sheets

(51) Int. Cl.
*G06F 3/0484* (2013.01)
*G06F 3/0482* (2013.01)
*H04L 12/911* (2013.01)
*G06F 9/50* (2006.01)
*G06F 9/445* (2006.01)

(56) References Cited

U.S. PATENT DOCUMENTS

| | | | | |
|---|---|---|---|---|
| 8,572,612 B2* | 10/2013 | Kern | ................. | G06F 9/5072 |
| | | | | 717/177 |
| 2009/0210875 A1* | 8/2009 | Bolles | ................. | G06F 3/0608 |
| | | | | 718/1 |
| 2010/0100880 A1* | 4/2010 | Shigeta | ............ | H04L 12/6418 |
| | | | | 718/1 |
| 2014/0058871 A1* | 2/2014 | Marr | ................. | G06F 9/45533 |
| | | | | 705/26.1 |
| 2014/0280961 A1* | 9/2014 | Martinez | ............ | H04L 41/5054 |
| | | | | 709/226 |
| 2015/0089064 A1* | 3/2015 | Salle | ................. | H04L 47/125 |
| | | | | 709/226 |

OTHER PUBLICATIONS

Vaquero, Luis M., Luis Rodero-Merino, and Rajkumar Buyya. "Dynamically scaling applications in the cloud." ACM SIGCOMM Computer Communication Review 41.1 (2011), pp. 45-52.*

Espadas, Javier, et al. "A tenant-based resource allocation model for scaling Software-as-a-Service applications over cloud computing infrastructures." Future Generation Computer Systems 29.1 (2013), pp. 273-286.*

* cited by examiner

METHODS AND APPARATUS TO SCALE APPLICATION DEPLOYMENTS IN CLOUD COMPUTING ENVIRONMENTS USING VIRTUAL MACHINE POOLS

RELATED APPLICATIONS

Benefit is claimed under 35 U.S.C. 119(a)-(d) to Foreign application Serial No. 3116/CHE/2014 filed in India entitled "METHODS AND APPARATUS TO SCALE APPLICATION DEPLOYMENTS IN CLOUD COMPUTING ENVIRONMENTS USING VIRTUAL MACHINE POOLS", filed on Jun. 26, 2014, by VMware, Inc., which is herein incorporated in its entirety by reference for all purposes.

FIELD OF THE DISCLOSURE

This disclosure relates generally to virtualized computing environments, and, more particularly, to methods and apparatus to scale application deployments in cloud computing environments using virtual machine pools.

BACKGROUND

"Infrastructure-as-a-service" (sometimes referred to as "IaaS") generally describes a suite of technologies provided by a service provider as an integrated solution to allow for elastic creation of a fully virtualized, network, and pooled computing platform (sometimes referred to as a "cloud computing platform"). Enterprises may use IaaS as a business-internal organizational cloud computing platform (sometimes referred to as a "private cloud" or a "private cloud computing platform") that gives an application developer access to infrastructure resources, such as virtualized servers, storage, and networking resources. By providing ready access to the hardware resources required to run an application, the cloud computing platform enables application developers to build, deploy, and manage the lifecycle of a virtual application e.g., a web application, a networked application, etc.) at a greater scale and at a faster pace than before. To deploy an application, a developer, who understands the architecture of the application, must coordinate with a system administrator, who controls access to computing resources, to determine which computing resources (e.g., computing, networking, and/or storage) and/or software services (e.g., software packages) should be provisioned to support execution of the application.

DETAILED DESCRIPTION

Figure 1:
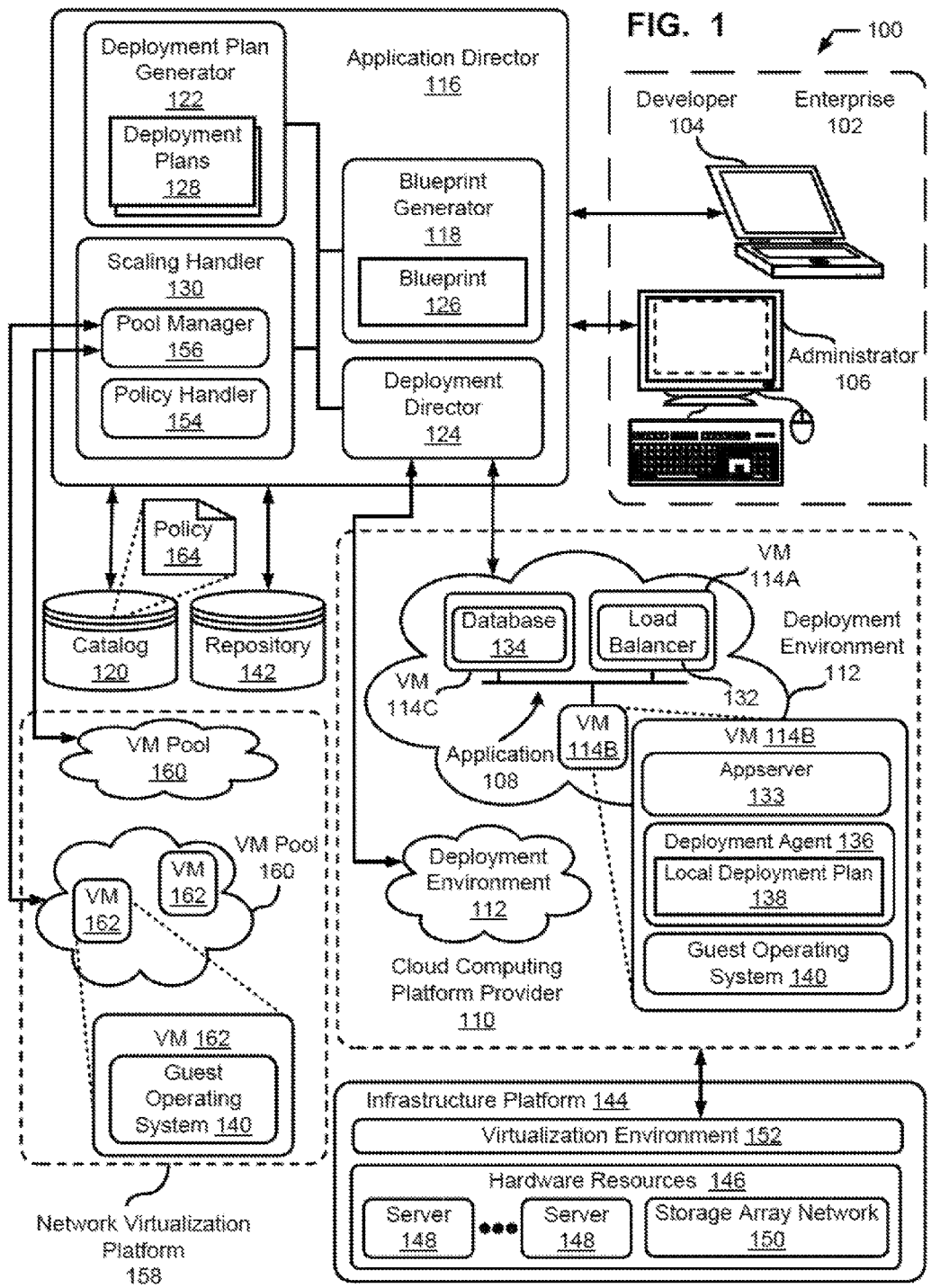
FIG. 1 is a block diagram of an example cloud computing environment constructed in accordance with the teachings of this disclosure to scale application deployments in cloud computing environments using virtual machine pools.

Numerous tools exist to create and deploy applications in cloud computing environments. For example, application provisioning tools enable cloud computing designers to create and standardize application deployment topologies on infrastructure clouds. Some application provisioning tools include graphical user interfaces (GUIs) that enable designers to generate application deployment topologies called application blueprints. These application blueprints define the structure of an application, enable the use of standardized application infrastructure components, and/or include installation dependencies and/or default configurations for custom and packaged enterprise applications. Application blueprints specify logical deployment topologies that are portable across private IaaS clouds (e.g., an enterprise cloud based on VMware vSphere® Platform or any other suitable private cloud network) and across public clouds (e.g., Amazon Web Services ("AWS") or any other suitable public cloud network). Cloud providers offer a cloud instance for deployment. The deployment environment provides an environment for the cloud provider.

Many applications are developed with a multi-tier architecture in which functions such as presentation, application processing, and data management are logically separate components. For example, an enterprise's custom banking application that has a multi-tier architecture may use a cluster of application server nodes (e.g., Moss Application Servers) to execute in a scalable runtime environment, a database node (e.g., a relational database management system such as MySQL) to store account data, and a load balancer node to distribute network traffic for robustness. Deploying a multi-tiered application in a cloud computing environment may involve a cloud computing platform provider (e.g., VMware®) providing a deployment environment to provision virtual computing resources (e.g., virtual machines (VMs)) in which an enterprise (e.g., an organization, an agency, a corporation, etc.) can deploy its application. When the application is deployed, workloads (e.g., schedules/collections of one or more processes or tasks) assigned to virtual computing resources may change over time. In situations, when workloads decrease, the enterprise may be paying for idle or underutilized virtual computing resources to which workloads are no longer assigned. In contrast, when workloads increase, the enterprise performance may decrease as a result of providing slower services to customers as the virtual computing resources are overloaded.

To more efficiently use resources in a virtual computing environment, examples disclosed herein enable scaling in and scaling out processes. For example, resources (e.g., virtual machines, networking resources, storage resources, etc.) may be allocated (e.g., scaled-out) for use by a virtual computing node when workloads increase at the computing node. In addition, resources can be freed (e.g., scaled-in) from the computing node when workloads decrease at that computing node. In this manner, resources are not inefficiently sitting idle at a virtual computing node when, for example, the node has no need for those resources. Also, the virtual computing node is allocated additional resources when needed to, for example, address increased workloads.

Examples disclosed herein include a scaling handler that scales a node (e.g., a virtual machine or a cluster of virtual machines) based on, for example, utilization of virtual computing resources. For example, referencing the custom banking application example from above, during periods of increased resource utilization (e.g., peak tax season), the scaling handler may scale-out (e.g., increase) the number of application servers included in the first node to reduce the burden of increased workloads across the node. Unlike prior systems, examples disclosed herein facilitate a scale-out operation by, for example, provisioning (e.g., allocating) one or more virtual machine(s) of a first node in the deployment environment and updating other nodes that may be dependent on the first node to include a reference to the provisioned virtual machines. For example, a load balancer may obtain configuration information from the newly provisioned virtual, machines to allocate resources to them.

Typically, provisioning virtual machines accounts for a disproportionate amount of time in scale-out operations. For example, in some common scale-out systems, provisioning a virtual machine can account for 35 percent of the overall time it takes to perform the scale-out operation. Thus, virtual machine provisioning is a performance bottleneck, which may undesirably consume time and computing resources.

Examples disclosed herein include a pool manager to create a pool of virtual machines that are provisioned and may be readily fetched during a scale-out operation. The pool of virtual machines may be provisioned during a first deployment of the application, during a first scale-out operation, or may be created prior to deploying the application. Examples disclosed herein may customize the virtual machines in the pools based on client preferences. Once configured, the virtual machines in the pools are placed in a suspended-state until fetched during a scale-out operation.

Examples disclosed herein include a policy handler to guide the scaling operation based on a virtual machine (VM) pool policy specified by a user (e.g., an application developer, an administrator, etc.). For example, a client may elect not to incorporate VM pools (e.g., utilize prior systems performing scaling operations), utilize one or more general VM pools, or utilize one or more application-level customized VM pools.

General VM pools are collections of one or more virtual machines that have been provisioned and configured to execute an operating system. For example, while applying a VM pool policy, the policy handler may cause the pool manager to create a first VM pool executing Microsoft Windows® and a second VM pool executing a Linux® operating system. Virtual machines from general VM pools may be fetched and configured to execute one or more application components of a deployed application.

Application-level customized VM pools are collections of one or more virtual machines that have been provisioned and pre-loaded with software to execute a specified program. For example, a pool manager creating an application-level customized VM pool may provision virtual machines, configure the virtual machines to execute an operating system, install and configure an application component, and install an application. Examples disclosed herein create a separate customized VM pool for each application. Thus, for example while applying another example VM pool policy, the policy handler may cause the pool manager to create a first VM pool configured to execute a first application and a second VM pool configured to execute a second application.

To more efficiently perform a scaling operation, examples disclosed herein fetch virtual machines from a corresponding VM pool during the scaling operation. Once a virtual machine is retrieved from the VM pool, it may be started (e.g., powered-ON) and installed with application artifacts (e.g., property files, application-specific script files, third party JARs, and application source/JARs). In this manner, the overall time to perform a scale-out operation can be reduced from minutes to seconds (e.g., because the intensive provisioning process for the virtual machines has been partially or completely performed at an earlier time).

Examples disclosed herein create VM pools within a cloud provider interface and/or within a network virtualization platform. For example, a VM pool may be created in a network of storage arrays connected to and shared between groups of servers through storage area networks to be aggregation of storage resources and to provide increased flexibility in provisioning the storage resources to, for example, the virtual machines. For example, the pool manager may create example general VM pools within deployment environments provided by a cloud computing platform provider, and may create application-level customized VM pools within a network of storage arrays.

As used herein, a node is a virtual machine and/or a cluster of virtual machines (also referred to as a "cluster node"). A virtual machine is a software stack comprising one or more operating systems, applications and/or services. As used herein, an application (also referred to herein as a "virtual application" or an "appliance") is a logical deployment unit that defines the relationship between an operating system one or more application components and/or services dependent on the operating system. An application may also define the relationship between application components that can be distributed across multiple virtual machines. As used herein, an application component refers to services and/or code components. Code components are application-specific binaries, scripts, or processes, etc., usually written by a developer and packaged into one or more files, to provide logic (e.g., relationship definitions) for an application. In some examples, code components may be a type or format of scripting and application code. Example types of code components include Java Archive (JAR) files, Java Enterprise Archive (EAR) files, Java web application archive (WAR) files, Ruby Gem packages, SQL scripts, and other suitable modules of scripting logic. Services, as used herein, are scripted software that provide a software infrastructure for an application. Services may be reused in multiple applications. Example services include application servers (e.g., Rails, Apache Tomcat, JBoss, etc.), database servers (e.g., GemFire, MySQL, SQLFire, MongoDB, Postgress, etc.), monitoring services (e.g., Hyperic, SpringInsight, etc.), web servers (e.g., Apache, VMWare vFabric Enterprise Ready Server, etc.), messaging services (e.g., RabbitMQ, etc.), middleware services, etc. As used herein, the term component generally refers to one or more of application components, code components, and/or services.

FIG. 1 illustrates an example cloud computing environment 100. In the illustrated example of FIG. 1, an example application 108 created by an example developer 104 is deployed for an example enterprise 102 in an example deployment environment 112 provided by an example cloud computing platform provider 110 (also referred to as a "cloud provider"). In the illustrated example, the cloud computing platform provider 110 of FIG. 1 provides multiple deployment environments 112, for example, separate deployment environments may be used for development, testing, staging, and production of the application 108. The example enterprise 102 may access services from the example cloud computing platform provider 110, for example, via a client-server communication protocol such as representational state transfer (REST) application programming interfaces (APIs). In the illustrated example of FIG. 1, the cloud computing provider 110 provisions virtual computing resources (e.g., example virtual machines 114) to provide the deployment environment 112 in which the enterprise 102 can deploy the application 108 (e.g., a multi-tiered application).

In the illustrated example of FIG. 1, the developer 104 uses an example application director 116, which may be implemented by one or more virtual machines 114, to orchestrate deployment of the application 108 into the deployment environment 112. In the illustrated example of FIG. 1, the application director 116 includes an example blueprint generator 118, an example deployment plan generator 122, an example deployment director 124, and an example scaling handler 130.

In the illustrated example of FIG. 1, the example blueprint generator 118 generates an example application blueprint 126 specifying a logical topology of the application 108, which is to be deployed. The example blueprint 126 maps the structure of the application 108 as a collection of components/nodes (e.g., an example load balancer node 132, an example application server (appserver) node 133, and an example database node 134). Applications, such as the application 108 of FIG. 1, are typically developed with a multi-tier architecture in which functions such as presentation, application processing, and data management are logically separate components. For example, the blueprint generator 118 may generate a blueprint 126 (e.g., a topology map) for an online store application specifying a web application executing on an application server (e.g., an Apache Tomcat application server) that uses a data store as a database (e.g., a MongoDB). The example web application may be implemented by a Java web application archive (e.g., a "WAR" file) comprising dynamic web pages, static web pages, Java servlets, Java classes, and/or other properties, configuration information and/or resource files included in the Java web application. In the illustrated example, the blueprint 126 is an abstract representation of the structure of the application 108 including virtual machines and their corresponding application components, operating systems, dependencies and/or configurations. In some examples, the blueprint 126 standardizes the structure of an application for repeated deployments in multiple and/or diverse deployment environments. The application 108 may alternatively describe the entire online store application, including application server components and database components, rather than just the web application itself.

In the illustrated example of FIG. 1, the blueprint generator 118 retrieves virtual computing resources from an example catalog 120 to assemble the blueprint 126. For example, the catalog 120 may list virtual computing resources (e.g., virtual machines, networking resources, storage resources, etc.) that may be provisioned from the cloud computing platform provider 110 and corresponding application components (e.g., software services, scripts, code components, application-specific packages, etc.) that may be installed on the provisioned virtual computing resources. The example catalog 120 of the illustrated example is pre-populated with available virtual computing resources and/or application components. In some examples, an administrator 106 (e.g., an information technology (IT) administrator, a system administrator, etc.) customizes the catalog 120 by adding and/or modifying the available virtual computing resources and/or application components listed in the catalog 120. For example, the administrator 106 may enter specifications, configurations, properties, custom tasks, etc. about each entry in the catalog 120. The example blueprint 126 of the illustrated example includes an installation order for the application components during deployment. For example, the blueprint 126 may define dependencies between one or more of the application components. For example, the developer 104 may specify a dependency from an Apache service (e.g., the example load balancer node 132) to an application code package such as a web application (e.g., the example appserver node 133). In some such examples, the dependency may be that the load balancer may not be configured until installation of the web application is complete.

In the illustrated example of FIG. 1, the deployment plan generator 122 generates an example deployment plan 128 based on the blueprint 126. The example deployment plan 128 includes deployment settings (e.g., state information such as virtual computing resource cluster sizes, processing resources, memory, networking resources, etc.) and an execution plan identifying tasks having an order in which virtual computing resources are provisioned and application components are installed, configured, and started. The example deployment plan 128 of the illustrated example is a process-oriented view of the blueprint 126. For example, the administrator 106 may follow discrete steps included in the deployment plan 128 to deploy the application 108. In some examples, different deployment plans 128 may be generated from a single blueprint 126 to test prototypes (e.g., new application versions), to scale (e.g., scale-out or scale-in) deployments, and/or to deploy the application 108 to different deployment environments (e.g., testing environments, staging environments, production environments, etc.).

In the illustrated example, the deployment plan generator 122 generates the deployment plan 128 in response to user input (e.g., from the developer 104) to initiate a deployment process for the application 108 in a specified deployment environment 112. In some examples, the deployment plan generator 122 allows the administrator 106 to insert one or more custom tasks in the deployment plan 128. For example, custom tasks may be scripts that, when executed by a virtual machine, perform operations that facilitate deployment of the application 108, including, for example, monitoring, tasks, e-mail and alert notification tasks, operations that pre-configure a virtual machine, operations performed prior to provisioning a virtual machine, and other scripting operations.

The example deployment director 124 of FIG. 1 orchestrates execution of the example deployment plan 128 for the application 108 in coordination with the example virtual machines 114 included in the deployment. The example deployment director 124 communicates with the cloud computing platform provider 110 to provision and configure the example virtual machines 114 in the deployment environment 112, as specified by the deployment plan 128. In some examples, the deployment director 124 separates the deployment plan 128 into local deployment plans for each virtual machine 114. In the illustrated example, the deployment director 124 maintains a central state of the deployment process that specifies the dependencies at deployment time between tasks to be performed across the virtual machines 114 in a specified order. For example, the deployment director 124 may send a message to one or more of the virtual machines 114 when deployment-time dependencies in their respective local deployment plans are satisfied.

In some examples, the deployment director 124 monitors the status of the virtual machines 114 and may perform a heartbeat procedure when a virtual machine is unresponsive (e.g., due to host failure, networking failure, etc.). The example deployment director 124 initiates a "timeout" interval for the virtual machines 114 that defines a maximum amount of time before a virtual machine is deemed "timed out" and is checked for failure. When the "timeout" interval expires, the example deployment director 124 sends a heartbeat message to the "timed out" virtual machine. For example, the heartbeat message may request that the "timed out" virtual machine respond with status and task updates (e.g., within one minute of the heartbeat).

The example scaling handler 130 of FIG. 1 facilitates scaling of an application deployed in the deployment environment 112. The scaling handler 130 of the illustrated example performs monitoring and modifying operations on the deployment (e.g., scale-in, scale-out, update, etc.). The example scaling handler 130 monitors resource utilization (e.g., computer processing) in the deployment environment 112 and initiates a scaling operation in response to obtained resource utilization information. For example, the scaling handler 130 may dynamically initiate a scale-out operation when resource utilization of a workload increases, and/or initiate a scale-in operation when resource utilization of the workload decreases.

In some other examples, the scaling handler 130 initiates a scaling operation (e.g., scale-in or scale-out) based on a schedule. For example, the scaling handler 130 may initiate a first scale-out operation at 8:00 AM on weekdays to increase a number of web servers deployed in the deployment environment 112 from, for example, three web servers to, for example, seven web servers and/or initiate a second scale-out operation at 9:00 PM on Sundays to return the number of web servers deployed in the deployment environment 112 from two web servers (e.g., where the deployment environment was previously scaled-in to two web servers) to three web servers. The example scaling handler 130 may additionally or alternatively initiate a first scale-in operation at 5:00 PM on weekdays to return the number of web servers deployed in the deployment environment 112 from seven web servers to three web servers, the scaling handler 130 may initiate a second scale-in operation to decrease the number of web servers deployed in the deployment environment 112 from three web servers to two web servers, etc. The scaling handler 130 is described in further detail in conjunction with FIG. 3.

The example scaling handler 130 includes an example policy handler 154 to determine whether scaling operations performed on the nodes 132-134 of the application 108 are to be guided by (e.g., performed in accordance with) an example VM pool scaling policy 164. In the illustrated example, the policy handler 154 determines whether there is a VM pool scaling policy 164 applicable to the deployed application 108. If no policy 164 is available and/or applicable to the deployed application 108, the example scaling handler 130 performs a scale-out operation by provisioning new virtual machines 114 in the deployment environment 112 and configuring the virtual machines 114 for use in the deployment environment 112.

If the example policy handler 154 of FIG. 1 determines that there is a VM pool scaling policy 164 applicable and/or available to the deployed application 108, then the policy handler 154 initiates generation of example VM pools 160. For example, the policy handler 154 may instruct an example pool manager 156 to reserve an environment for the VM pools 160. In some examples, the policy handler 154 initiates generation of the VM pools 160 before application deployments. For example, the policy handler 154 may obtain the blueprint 126 generated by the example blueprint generator 118 and, after determining that a VM pool scaling policy 164 is applicable and/or available to application 108 defined in the blueprint 126, the policy handler 154 may instruct the example pool manager 156 to generate the VM pools 160. In some examples, the policy handler 154 initiates generation of the example VM pools 160 during the first deployment of the application 108. In other examples, the policy handler 154 initiates generation of the example VM pools 160 when a first scale-out operation is to be performed on the application 108 deployment or at another time.

In the illustrated example of FIG. 1, the VM pool scaling policy 164 is stored and/or retrieved from the example catalog 120. The VM pool scaling policy 164 defines the rules that apply to a scaling operation performed on a deployment of the example application 108. For example, the VM pool scaling policy 164 may provide information regarding how many VM pools 160 are to be generated, how many virtual machines are to be included in each VM pool 160, how the virtual machines in the ones of the VM pools 160 are to be configured (e.g., configured to execute a specified operating system (e.g., a general virtual machine), configured to execute a specified application component (e.g., an application-level customized virtual machine), etc.). In some examples, the VM pool scaling policy 164 includes rules for when and/or whether a VM pool expansion may be performed. For example, the VM pool scaling policy 164 may specify that an initial VM pool 160 is to include five application-level customized virtual machines. In such an example, if a scale-out operation is to be performed that needs more than the five virtual machines available in the VM pool 160, the policy handler 154 may initiate a one-time expansion of the VM pool 160 to add five additional virtual machines that are general virtual machines. In this manner, clients can determine whether they would prefer to save costs by using fewer virtual machines, or improve performance efficiency by having more virtual machines available for scaling an application (e.g., to quickly scale-out an application using the multiple pre-provisioned virtual machines in the VM pool 160).

In the illustrated example of FIG. 1, the example scaling handler 130 includes the example pool manager 156 to manage VM pools 160 generated in the cloud computing environment 100. For example, the pool manager 156 of FIG. 1 generates the VM pools 160 when initiated (e.g., instructed) by the example policy handler 154. When initiated, the example pool manager 156 of the illustrated example reserves one or more environments for hosting the VM pools 160. For example, the pool manager 156 may request one or more environments from the cloud computing platform provider 110. In some examples, an example network virtualization platform 158 (e.g., a network of storage arrays connected to and shared between groups of servers through storage area networks, thereby enabling aggregating storage resources and enabling increased flexibility in provisioning the storage resources to, for example, the virtual machines) provides one or more environments in which the pool manager 156 may generate VM pools 160.

In the illustrated example, the example virtual machine pools 160 are environments that host example virtual machines 162. In contrast to the virtual machines 114 in the deployment environment 112, the virtual machines 162 deployed in the example VM pool 160 are in a suspended-state. That is, the virtual machines 162 are not powered-ON. As a result, while the example virtual machines 162 of FIG. 1 are provided networking details (e.g., internet protocol (IP) addresses), the virtual machines 162 are inaccessible to the deployed application 108 (e.g., cannot be messaged (e.g., "pinged") or accessed via a secure shell (SSH) server). In the illustrated example, the pool manager 156 maintains a record (e.g., log) of the suspended-state virtual machines 162. For example, the pool manager 156 may store, in a data structure such as a look-up table, IP addresses for the suspended-state virtual machines 162, the number of virtual machines 162 available in the example VM pool 160, the configurations of the example virtual machines 162 (e.g., guest operating system identifiers, what (if any) component services and/or application components are installed on the virtual machines 162, etc.).

Although the scaling operations discussed above describe scale-out operations, scale-in operations may also be guided by the VM pool scaling policy. For example, as specified by the VM pool scaling policy 164, if the 100 includes VM pools (e.g., the example VM pool 160), rather than shutting-down (e.g., deleting) selected ones of the virtual machines 114 while performing the scale-in operation, the example scaling handler 130 transitions the selected ones of the virtual machines 114 into the suspended-state. The example scaling handler 130 may then return the suspended-state virtual machines from the deployment environment 112 to the VM pool 160. In some examples, depending on the attributes of the VM pool scaling policy 164, the scaling handler 130 may shut-down and/or delete the selected ones of the virtual machines 114 even if the VM pool scaling policy 164 specifies the VM pool 160. For example, if returning the selected ones of the virtual machines 114 to the VM pool 160 would exceed the maximum number of virtual machines permitted in the VM pool 160 by the VM pool scaling policy 164, the scaling handler 130 may shut-down and/or delete the selected ones of the virtual machines 114 to release the resources assigned to the selected ones of the virtual machines 114.

In the illustrated example of FIG. 1, the deployment director 124 provides a communication abstraction layer by which the application director 116 may communicate with, for example, a heterogeneous mixture of cloud computing platform provider(s) 110 and deployment environment(s) 112. In the illustrated example, the deployment director 124 provides the virtual machines 114 with a series of tasks specific to (e.g., customized for) the respective virtual machines 114 (e.g., an example local deployment plan 138). The tasks may be scripts that are executed by the respective virtual machines 114 to install, configure, and/or start one or more components/nodes (e.g., the example load balancer node 132, the example appserver node 133 and/or the example database node 134). For example, a task may be a script that, when executed by the virtual machines 114, causes the respective virtual machines 114 to retrieve and install particular software packages from an example central package repository 142 (e.g., a Git repository, a package manager and/or other application component resources).

In the illustrated example, the deployment director 124 coordinates with the virtual machines 114 to execute the tasks in an order that observes installation dependencies between the virtual machines 114 according to the deployment plan 128. For example, in the deployment environment 112, the example load balancer node 132 is executed by the virtual machine 114a, the appserver node 133 is executed by the virtual machine 114b, and the database node 134 is executed by the virtual machine 114c. The virtual machine 114a of the illustrated example is configured based on the deployment plan 128 to coordinate execution of tasks to deploy the load balancer node 132 to run in the deployment environment 112. The virtual machine 114b of the illustrated example is configured based on the deployment plan 128 to coordinate execution of tasks to deploy the appserver node 133 to run in the deployment environment 112. The virtual machine 114c of the illustrated example is configured based on the deployment plan 128 to coordinate execution of tasks to deploy the database node 134 to run in the deployment environment 112. Although the load balancer node 132, the appserver node 133 and the database node 134 are shown running on separate virtual machines 114, in other examples, one or more of the nodes 132, 133, 134 may run on the same virtual machine 114. For example, the load balancer node 132 may run on the virtual machine 114a, while the appserver node 133 and the database node 134 may run on the same virtual machine 114b.

In the illustrated example of FIG. 1, the cloud computing platform provider 110 utilizes an infrastructure platform 144 upon which the deployment environment 112 may be executed. The infrastructure platform 144 of the illustrated example includes example hardware resources 146, such as example servers 148 (e.g., hardware servers), networking hardware and one or more example storage array networks 150, to provide an example virtualization environment. The example virtualization environment 152 (also referred to as a hypervisor or a virtual machine monitor) facilitates execution of the virtual machines 114 across the servers 148. As discussed in more detail below, the virtual machines 114 provide the virtual computing resources (e.g., computing resources, networking resources, storage resources, etc.) that comprise the deployment environment 112. Example implementations of the virtualization environment 152 include VMware ESX™ based hypervisor technologies provided by VMware, Inc., the Xen® Hypervisor provided by The Linux Foundation, Hyper-virtualization technologies Microsoft® software, etc.

In the illustrated example of FIG. 1, the virtualization environment 152 facilitates providing resources of the infrastructure platform 144 to the deployment environment 112. The virtualization environment 152 instantiates virtual machines according to a cloud template that defines a virtual machine having specified virtual computing resources. For example, a cloud template may comprise metadata that describes the configuration of a virtual machine including computing resources, networking resources, storage resources, etc., and other supporting libraries pre-installed and/or available for use to repeatedly create a virtual machine having the specified settings.

In the illustrated example of FIG. 1, the virtual machines 114 are hosted by (e.g., executing within) the virtualization environment 152 on one or more of the example servers 148. For example, the virtualization environment 152 may provide resources for the example deployment environment 112 within which one or more of the virtual machines 114 may be concurrently instantiated and/or executed. In some examples, the visualization environment 152 virtualizes resources equivalent to the example hardware resources 146. For example, the virtualization environment 152 may emulate hardware such as virtual hard drives, virtual networking resources, virtual processors, virtual memory, etc. for use by the virtual machines 114. In the illustrated example of FIG. 1, the virtualization environment 152 facilitates executing operating systems (e.g., Microsoft Windows®, Linux®, Solaris® x86, Netware, FreeBSD, etc.), and the virtualization environment 152 may include one or more guest operating systems 140 to execute nodes 132, 133, 134.

The example virtual machines 114 of the illustrated example include a pre-installed bootstrap script that, upon first boot, retrieves an example deployment agent 136 (e.g., packaged as a JAR file) from the example deployment director 124. Alternatively, the deployment agent 136 may be pre-installed on the virtual machine 114. In the illustrated example of FIG. 1, the deployment agent 136 obtains a local deployment plan 138 from the deployment director 124 and executes the local deployment plan 138 in coordination with the deployment director 124.

In the illustrated example of FIG. 1, the example deployment agent 136 is a process or daemon that communicates with the example deployment director 124. For example, the deployment agent 136 may communicate with the deployment director 124 via an example addressing and discovery layer (e.g., a common interface through which components of the example deployment environment 112 can communicate and receive notifications) to obtain the example local deployment plan 138. The example deployment agent 136 of the illustrated example facilitates executing scripts representative of tasks included in the local deployment plan 138 in coordination with the deployment director 124. For example, executing scripts may include retrieving, unpacking, installing, and/or configuring application component packages. In the illustrated example, the application component packages include a plurality of files, similar to those in a WAR file, organized into a tape archive file or a "tar" file, and that may be retrieved via download from, for example, a Git repository, a package manager, and/or other application component resources. In some examples, the deployment agent 136 may provide execution status to the deployment director 124 for tasks that have been successfully executed on the virtual machine 114. In the illustrated example, the deployment agent 136 responds to a heartbeat message received from the deployment director 124.

As used herein, the phrase "in communication," including variances thereof, encompasses direct communication and/or indirect communication through one or more intermediary components. Indirect communication does not require direct physical (e.g., wired) communication and/or constant communication, but rather additionally includes selective communication at periodic intervals, scheduled intervals, manual intervals, aperiodic intervals and/or one-time events.

As described above, FIG. 1 depicts the example cloud computing environment 100 in which a deployed application can be scaled (e.g., scaled-out or scaled-in) within the example deployment environment 112. The example scaling handler 130 includes the example policy handler 154 to determine whether VM pool scaling policies are to be applied to scaling operations in the deployment environment. If the example policy handler 154 of FIG. 1 determines that there is a VM pool scaling policy to be applied to the example deployment of the application 108, then the example pool manager 156 generates and manages VM pools 160 from which the scaling handler 130 may fetch virtual machines 160 (e.g., virtual machines in a suspended state) rather than provisioning the virtual machines 114 in the deployment environment 112. In some such instances, the overall time to perform a virtual machine scale-out operation may be reduced as new virtual machines do not need to be provisioned, but rather, a virtual machine with pre-installed services and/or software may be retrieved at the time of the scale-out, thereby improving efficiency in performing scaling operations.

Figure 2:
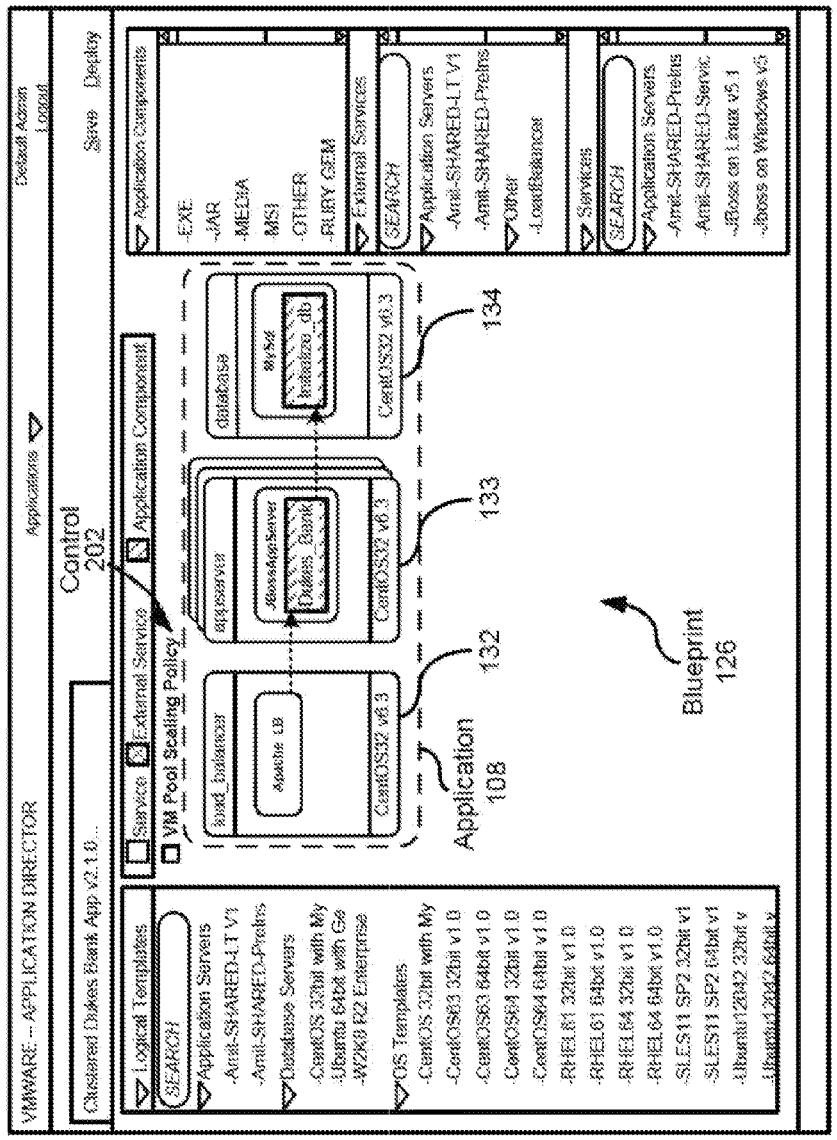
FIG. 2 illustrates an example graphical user interface generated by the example application director of FIG. 1 to generate an application blueprint for an application.

FIG. 2 depicts an example blueprint generator graphical user interface (GUI) 200 of the example blueprint generator 118 of FIG. 1. The example blueprint generator GUI 200 is provided to the example blueprint generator 118 to enable users (e.g., the developer 104 of FIG. 1) to specify application deployment configurations. In the illustrated example, the blueprint generator GUI 200 shows the blueprint 126 of FIG. 1 of the application 108 of FIG. 1 that includes the load balancer node 132, the appserver node 133, and the database node 134. In the illustrated, example, the blueprint generator GUI 200 is provided with a user-selectable 'VM Pool Scaling Policy' GUI control 202 (e.g., a 'VM Pool Scaling Policy' field) that is displayed to allow a user to specify whether scaling operations (e.g., scale-out operations and/or scale-in operations) performed on the nodes 132-134 of the application 108 are to be guided by a VM pool scaling policy (e.g., the example VM pool scaling policy 164 of FIG. 1).

In the illustrated example, when the 'VM Pool Scaling Policy' GUI control 202 is not selected in the example blueprint generator GUI 200 by a user, the blueprint generator 118 of FIG. 1 detects the non-selection of the 'VM Pool Scaling Policy' GUI control 202 and configures the blueprint 126 of the application 108 to indicate that scale-out operations of the nodes 132-134 are to be performed by provisioning the requested number of virtual machines in the deployment environment 112. In such instances, the scaling handler 130 instantiates the specified number of virtual machines in the deployment environment 112, configures the instantiated virtual machines 114 to execute the example guest operating system 140 and one or more application components (e.g., the load balancer node 132, the appserver node 133, the database node 134), and then installs the application on the virtual machines 114.

In the illustrated example, when the 'VM Pool Scaling Policy' GUI control 202 is selected in the example blueprint generator GUI 200 by a user, the blueprint generator 118 of FIG. 1 detects the selection (e.g., via a flag or value set to true, on, yes, one, etc.) of the 'VM Pool Scaling Policy' GUI control 202 and configures the blueprint 126 of the application 108 to indicate that scaling operations are to be guided by the VM pool scaling policy 164. For example, during a scale-out operation, the scaling handler 130 may perform a check to see if the resources in the VM pool 160 can meet the requirements of the scale-out operation. In such instances, rather than performing the time-consuming process of provisioning virtual machines in the deployment environment 112, the suspended-state virtual machines 162 may be moved from the VM pool 160 to the deployment environment 112 and powered-ON to be ready for additional configuration. For example, the scaling handler 130 may fetch suspended-state virtual machines from the VM pool 160 to the deployment environment 112 when, for example, the VM pool 160 includes at least the number of suspended-state virtual machines 162 requested for performing the scale-out operation. If, however, the scaling handler 130 determines that the resources available in the VM pool 160 do not meet the requirements of the scale-out operation, the scaling handler 130 may then provision the specified number of virtual machines in the deployment environment 112. Alternatively, when the available resources do not meet the requirements, the scaling handler 130 may utilize the available suspended-state virtual machines 162 and provision additional virtual machines to satisfy the requirements.

Figure 3:
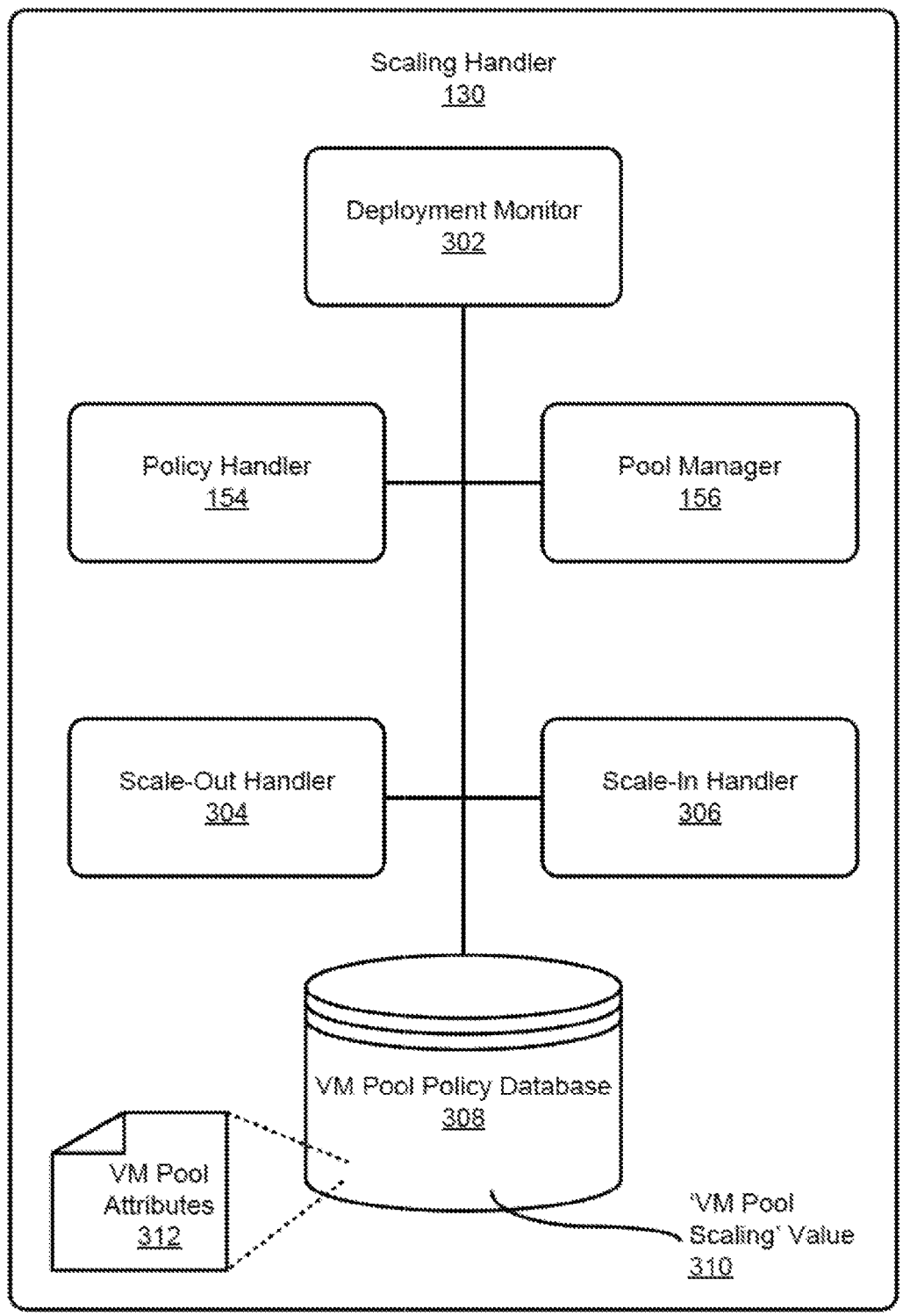
FIG. 3 is a diagram of the example scaling handler of FIG. 1.

FIG. 3 is a block diagram of an example implementation of the scaling handler 130 of FIG. 1. In the illustrated example of FIG. 3, the example scaling handler 130 controls scaling of application deployments in the deployment environment 112 of FIG. 1. The example scaling handler 130 of FIG. 3 includes the example policy handler 154, the example pool manager 156, an example deployment monitor 302, an example scale-out handler 304, an example scale-in handler 306 and an example VM pool policy database 308. The example VM pool policy database 308 may be implemented by any suitable memory (e.g., the random access memory 814 of FIG. 8, the local memory 813 of FIG. 8 the mass storage memory 828 of FIG. 8, etc.) to store computer readable data.

In the illustrated example of FIG. 3, the example policy handler 154 handles scaling operations based on VM pool scaling policies 164 available and/or applicable to deployed applications 108. For example, the policy handler 154 may determine whether a user (e.g., an administrator) has set a VM pool scaling policy 164 for applying to the application 108 deployed in the deployment environment 112. In the illustrated example, when the policy handler 154 determines that the VM pool scaling policy 164 applies to the deployed application 108, the policy handler 154 initiates generating the VM pools 160 and enforces the VM pool scaling policy 164 on the deployed application.

In the illustrated example, when triggered, the policy handler 154 initiates generation of the VM pools 160. For example, the policy handler 154 may be triggered when the application blueprint 126 is prepared. In some examples, the policy handler 154 is triggered to initiate generating the VM pools 160 when the application 108 is first deployed in the deployment environment 112. For example, while the deployment director 124 prepares the deployment environment 112, the example policy handler 154 may instruct the example pool manager 156 to generate (e.g., reserve, request, provide, etc.) the VM pools 160 for use during scaling operations. In some examples, the policy handler 154 instructs the example pool manager 156 to generate the VM pools 160 when a first scale-out operation request is received.

In the illustrated example, the policy handler 154 also enforces the VM pool scaling policy 160 once the VM pools 160 are generated. For example, when the policy handler 154 receives a request to perform a scale-out operation, the example policy handler 154 determines whether the VM pools 160 have the resources available for performing the scale-out operation. For example, if a scale-out operation requests two additional virtual machines, the example policy handler 154 determines whether there is a VM pool 160 with the adequate number of virtual machines (e.g., two virtual machines) to satisfy the scale-out operation request.

In the illustrated example, when the scale-out operation request can be satisfied by the resources available to the scaling handler 130 and abide by the rules specified by the VM pool scaling policy 164, then the example policy handler 154 sets an example 'VM Pool Scaling' value 310 to 'True.' When the example 'VM Pool Scaling' value 310 is 'True,' the scaling handler 130 is to perform the scale-out operation by fetching the suspended-state virtual machines 162 from the VM pools 160. When the scale-out operation request cannot be satisfied by the resources available to the scaling handler 130 and/or by abiding by the rules specified by the VM pool scaling policy 164 and/or there is no VM pool scaling policy 164 provided for the deployed application 108, the example policy handler 154 sets the example 'VM Pool Scaling' value 310 to 'False.' When the example 'VM Pool Scaling' value 310 is 'False,' then the scaling handler 130 performs scaling operations by provisioning the example virtual machine 114 in the deployment environment 112 and configuring the virtual machines 114 in the deployment environment 112. In the illustrated example, the policy manager 154 stores the 'VM Pool Scaling' value 310 in the example VM pool policy database 308.

In the illustrated example of FIG. 3, the example pool manager 156 manages the VM pools 160 in the example cloud computing environment 100. For example, the pool manager 156 may generate the VM pools 160 when requested (e.g., instructed by the example policy manager 154) by, for example, requesting environments from the example cloud computing platform provider 110 and/or the example network virtualization platform 158. In the illustrated example, the pool manager 156 maintains homogenous VM pools 160 so that the virtual machines 162 in the same ones of the VM pools 160 are configured similarly.

For example, the pool manager 156 may manage a first VM pool 160 having a first type of general virtual machines (e.g., virtual machines configured to execute a Microsoft Windows® operating system), a second VM pool 160 having a second type of general virtual machines (e.g., virtual machines configured to execute a Linux® operating system), and a third VM pool 160 having application-level customized virtual machines (e.g., virtual machines configured to execute the example appserver node 133 (FIG. 1)). In this manner, when a scaling operation requests additional virtual machines, the pool manager 156 may select virtual machines 162 from the VM pools 160 more suited for the scaling operation. For example, if a scaling operation requires an example database node 134 (FIG. 1) that executes on a Microsoft Windows® operating system, the example pool manager 156 may identify the first VM pool 160 as the best match, and return as many virtual machines as requested and/or available.

In the illustrated example of FIG. 3, the example pool manager 156 maintains a record of the VM pools in a data structure such as a lookup table. For example, the example pool manager 156 of FIG. 3 stores an example VM pool attributes table 312 in the VM pool policy database 308. The example VM pool attributes table 312 may include information regarding the different types of VM pools 160 available to the scaling handler 130 during a scaling operation (e.g., general virtual machines, application-level customized virtual machines, etc.).

In the illustrated example of FIG. 3, the example deployment monitor 302 monitors deployment environments (e.g., dependent environment 112 of FIG. 1) and determines whether to initiate a scaling operation and to what extent. For example, the deployment monitor 302 may monitor infrastructure resource consumption levels and requirements (e.g., workload) of the deployed application 108 in the deployment environment 112. In some examples, the deployment monitor 302 may compare resource utilization by the workload of the application 108 to utilization ranges. For example, the deployment monitor 302 may initiate a scale-in operation when resource utilization by the workload is in a first range (e.g., less than 25% utilization), may initiate a scale-out operation when resource utilization by the workload is in a second range (e.g., greater than 75% utilization), and may perform no scaling operation when resource utilization by the workload is in a third range (e.g., greater than or equal to 25% utilization and less than or equal to 75% utilization). In some examples, the deployment monitor 302 may compare the workload to one or more thresholds and scale the number of virtual machines (e.g., sub-nodes) executing the workload accordingly (e.g., increase or decrease the cluster size of a node).

For example, when the deployment monitor 302 of the illustrated example determines that the resource utilization by the workload satisfies a first threshold, the example deployment monitor 302 initiates a scale-out operation to add one or more virtual machines to the deployment environment. For example, the example deployment monitor 302 may initiate a first scale-out operation to add (e.g., provision and/or fetch from the VM pool 160 of FIG. 1) one additional virtual machine 114 when resource utilization by the workload exceeds 75% of available resources, the example deployment monitor 302 may initiate a second scale-out operation to add (e.g., provision and/or fetch from the VM pool 160) a second virtual machine 114 when resource utilization by the workload exceeds 85% of available resources, etc.

When the deployment monitor 302 of the illustrated example determines that resource utilization by the workload satisfies a second threshold, the example deployment monitor 302 initiates a scale-in operation to remove one or more virtual machines from the deployment environment. For example, the deployment monitor 302 may initiate a first scale-in operation to remove (e.g., de-provision and/or transition to the suspended-state and return to the VM pool 160) a first virtual machine 114 when resource utilization by the workload is less than 25% of available resources, the deployment monitor 302 may initiate a second scale-in operation to remove (e.g., de-provision and/or transition to the suspended-state and return to the VM pool 160) a second virtual machine 114 when resource utilization by the workload is less than 15% of available resources, etc. In some examples, the utilization records and/or the resource utilization thresholds are stored in a data structure such as a lookup table. In some examples, the utilization records and/or the resource utilization thresholds may be changed by the developer 104, the administrator 106 and/or any other person.

The deployment monitor 302 of the illustrated example may initiate a scaling operation according to a schedule. For example, the deployment monitor 302 may initiate a scale-out operation during work hours and may additionally or alternatively initiate a scale-in operation during night-time hours. In some examples, the deployment monitor 302 initiates a scaling operation based on, for example, a combination of resource utilization and timing intervals. For example, the deployment monitor 302 may initiate a scaling operation when the deployment monitor 302 determines that resource utilization satisfies a third threshold for a time interval (e.g., a minimum time interval). In some such examples, combining resource utilization and timing intervals may be beneficial in reducing the number of false positives due to, for example, spikes and/or surges in electricity or activity. For example, the deployment monitor 302 may initiate a scaling operation when resource utilization is greater than the first threshold for thirty seconds (e.g., thirty continuous seconds, at least thirty seconds during a sixty second running window, etc.), and, thereby reducing the number of scale-out operations initiated due to a temporary (e.g., less than thirty seconds) spike and/or surge in electricity or activities.

The example scaling handler 130 of FIG. 3 includes the example scale-out handler 304 to execute scale-out operations. For example, the scale-out handler 304 may obtain a message from the example deployment monitor 302 to initiate a scale-out operation when, for example, the infrastructure resource consumption levels and requirements exceed a threshold.

In the illustrated example of FIG. 3, the example scale-out handler 304 increases the number of virtual machines 114 deployed in the deployment environment 112 based on the 'VM Pool Scaling' value 310 obtained from the VM pool policy database 308. For example, when the 'VM Pool Scaling' value 310 is true, on, yes, one, etc. (e.g., the VM pool 160 is able to provide the requested number of virtual machines), the example scale-out handler 304 fetches the suspended-state virtual machines 162 from the VM pool 160 and powers-ON the fetched suspended-state virtual machines 162, thereby converting them to the virtual machines 114.

In contrast, when the 'VM Pool Scaling' value 310 is false, off, no, zero, etc. (e.g., the VM pool 160 is unable to provide the requested number of virtual machines and/or there is no VM pool scaling policy applicable to the deployment), the example scale-out handler 304 instantiates the specified of virtual machines by allocating infrastructure resources for creating a virtual machine in the deployment environment 112. The example scale-out handler 304 of FIG. 3 installs the guest operating system 140 and the deployment agent 146 on the instantiated ones of the virtual machines 114. The example scale-out handler 304 then restarts the instantiated ones of the virtual machines 114 to "clean-up" (e.g., remove) any components leftover from the provisioning of the instantiated ones of the virtual machines 114. In some examples, when the 'VM Pool Scaling' value 310 is false, off, no, zero, etc., the example scale-out handler 304 uses a combination of suspended-state virtual machines 162 and instantiated virtual machines 114 to perform the scale-out operation. For example, when the VM pool 160 is unable to provide the requested number of virtual machines, the scale-out handler 304 may provide the requested number of virtual machines by fetching a portion of the requested number of virtual machines from the VM pool 160 and instantiating the remaining number of virtual machines in the deployment environment 112.

In the illustrated example of FIG. 3, once the newly added ones of the virtual machines 114 (e.g., by fetching the suspended-state virtual machines 162 and/or provisioning the virtual machines 114) have been restarted and/or powered-ON, the example scaling handler 130 customizes the newly added ones of the virtual machines 114 by downloading and/or installing the component services to install the application component (e.g., the appserver nodes 133) on the newly added ones of the virtual machines 114. In some examples, the suspended-state virtual machines 114 may already be customized by the pool manager 156 by pre-installing the component services and/or nodes. The example scale-out handler 304 identifies one or more virtual machines 114 and/or nodes that the newly added ones of the virtual machines 114 may depend on and/or that may depend on the newly added ones of the virtual machines 114 (e.g., which, if any, of the virtual machines 114 and/or nodes from which the newly added ones of the virtual machines 114 obtains information from and/or provides information), and updates the configurations and properties of the virtual machines 114 to add references (e.g., an IP address, a hostname, etc.) to each other. In the illustrated example, the scale-in handler 304 verifies that the scale-out operation successfully completed by determining whether the newly added ones of the virtual machines 114 are associated (e.g., in communication) with the other components of the deployed application 108, may coordinate with the example deployment director 124 to ensure the current set of virtual machines 114 deployed in the deployment environment 112 includes the newly added ones of the virtual machines 114, etc.

In the illustrated example of FIG. 3, the scaling handler 130 includes the example scale-in handler 306 to execute scale-in operations. For example, the scale-in handler 306 may obtain a message from the example deployment monitor 302 to initiate a scale-in operation when, for example, the infrastructure resource consumption levels and requirements are less than a threshold. In the illustrated example, the scale-in handler 306 performs the scale-in operation by unconfiguring selected one or more of the virtual machines 114 and removing the selected ones of the virtual machines 114 from the deployment environment 112. The example scale-in handler 306 selects one or more of the virtual machines 114 to remove from the deployment environment 112 using algorithms such as last-in first-out (LIFO), first-in first-out (FIFO), randomizer, and/or enable a user (e.g., the administrator 106) to manually selected the ones of the virtual machines 114 to remove.

In the illustrated example, the scale-in handler 306 identifies one or more virtual machines and/or nodes dependent on the selected ones of the virtual machines 114 (e.g., via the blueprint 126 and/or the deployment plan 128) and disassociates the selected ones of the virtual machines 114 and the identified dependent ones of the virtual machines and/or nodes. For example, the scale-in handler 306 may remove references to the selected ones of the virtual machines 114 from the load balancer node 132 and/or performs a resource cleanup for the selected ones of the virtual machines 114 by releasing application-level and/or infrastructure-level resources used by the selected ones of the virtual machines 114.

In the illustrated example of FIG. 3, the example scale-in handler 306 removes the selected ones of the virtual machines 114 from the deployment environment 112 based on the 'VM Pool Scaling' value 310 obtained from the VM pool policy database 308. For example, when the 'VM Pool Scaling' value 310 indicates that the VM pool 160 is able to receive the selected ones of the virtual machines 114 (e.g., the 'VM Pool Scaling' value 310 is true, on, yes, one, etc.), the example scale-in handler 306 transitions the selected ones of the virtual machines 114 to the suspended-state, and returns them to the VM pool 160. In contrast, when the 'VM Pool Scaling' value 310 is indicative of the VM pool 160 being unable to receive the selected ones of the virtual machines 114 (e.g., the 'VM Pool Scaling' value 310 is false, off, no, zero, etc.), the example scale-in handler 306 removes the selected ones of the virtual machines 114 from the deployment environment 112 by initiating a shutdown sequence and deleting the selected ones of the virtual machines 114.

In some examples, the scale-in handler 306 may return a first subset of the selected ones of the virtual machines 114 to the VM pool 160 and delete a second subset (e.g., the selected ones of the virtual machines 114 not included in the first subset) of the selected ones of the virtual machines 114 from the deployment environment 112. For example, a scale-in operation may require removing two virtual machines 114 from the deployment environment 112, while the VM pool 160 is able to receive just one virtual machine. In such instances, the scale-in handler 306 may return a first one of the two virtual machines 114 to the VM pool 160 while deleting the second one of the two virtual machines 114.

While an example manner of implementing the example scaling handler 130 of FIG. 1 is illustrated in FIG. 3, one or more of the elements, processes and/or devices illustrated in FIG. 3 may be combined, divided, re-arranged, omitted, eliminated and/or implemented in any other way. Further, the example application 108, the example virtual machines 114, the example application director 116, the example blueprint generator 118, the example deployment plan generator 122, the example deployment director 124, the example blueprint 126, the example deployment plans 128, the example load balancer node 132, the example appserver node 133, the example database node 134, the example deployment agent 136, the example local deployment plan 138, the example infrastructure platform 140, the example server 148, the example storage array networks 150, the example network virtualization platform 158, and the example suspended-state virtual machines 162 may be implemented by hardware, software, firmware and/or any combination of hardware, software, and/or firmware. In addition, any or all of the example policy handler 154, the example pool manager 156, the example deployment monitor 302, the example scale-out handler 304, the example scale-in handler 306 and/or, more generally, the example scaling handler 130 of FIGS. 1 and/or 3 may be implemented by hardware, software, firmware and/or any combination of hardware, software and/or firmware. Thus, for example, any of the example application 108, the example virtual machines 114, the example application director 116, the example blueprint generator 118, the example deployment plan generator 122, the example deployment director 124, the example blueprint 126, the example deployment plans 128, the example load balancer node 132, the example appserver node 133, the example database node 134, the example deployment agent 136, the example local deployment plan 138, the example infrastructure platform 140, the example server 148, the example storage array networks 150, the example policy handler 154, the example pool manager 156, the example network virtualization platform 158, the example suspended-state virtual machines 162, the example deployment monitor 302, the example scale-out handler 304, the example scale-in handler 306 and/or, the example scaling handler 130 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application 108, the example virtual machines 114, the example application director 116, the example blueprint generator 118, the example deployment plan generator 122, the example deployment director 124, the example blueprint 126, the example deployment plans 128, the example load balancer node 132, the example appserver node 133, the example database node 134, the example deployment agent 136, the example local deployment plan 138, the example infrastructure platform 140, the example server 148, the example storage array networks 150, the example policy handler 154, the example pool manager 156, the example network virtualization platform 158, the example suspended-state virtual machines 162, the example deployment monitor 302, the example scale-out handler 304 and/or the example scale-in handler 306 is/are hereby expressly defined to include a tangible computer readable storage device or storage disk such as a memory, a digital versatile disk (DVD), a compact disk (CD), a Blu-ray disk, etc. storing the software and/or firmware. Further still, the example scaling handler 130 of FIGS. 1 and 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the scaling handler 130 of FIGS. 1 and/or 3 are shown in FIGS. 4-7. In this example, the machine readable instructions comprise a program for execution by a processor such as the processor 812 shown in the example processor platform 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program(s) is/are described with reference to the flowcharts illustrated in FIGS. 4-7, many other methods of implementing the example scaling handler 130 may alternatively be used. For example, the order of execution of the blocks may be changed, and/or some of the blocks described may be changed, eliminated, or combined.

As mentioned above, the example processes of FIGS. 4-7 may be implemented using coded instructions e.g., computer and/or machine readable instructions) stored on a tangible computer readable storage medium such as a hard disk drive, a flash memory, a read-only memory (ROW a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
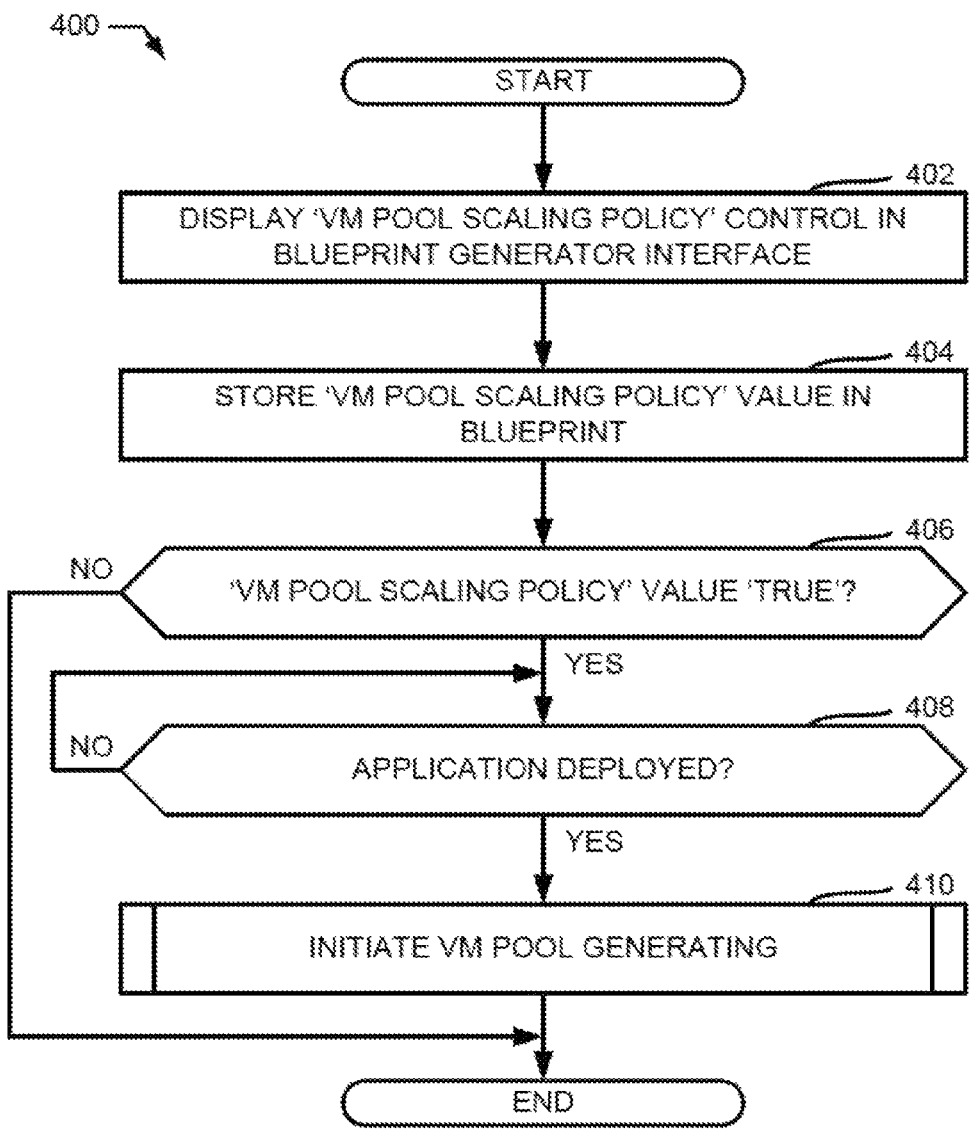
FIGS. 4-7 are flow charts representative of example machine-readable instructions that may be executed to scale an application deployment in the example cloud computing environment of FIG. 1 using virtual machine pools.

The example program of FIG. 4 begins at block 402 at which the example blueprint generator 118 (FIG. 1) displays the user-selectable 'VM Pool Scaling Policy' control 202 in the example blueprint generator GUI 200 (FIG. 2). At block 404, the example blueprint generator 118 stores a 'VM Pool Scaling' value 310 in the example blueprint 108 of FIG. 1, As discussed above, the value in the 'VM Pool Scaling' value 310 indicates whether the user-selectable 'VM Pool Scaling Policy' control 202 has been selected (e.g., the 'VM Pool Scaling' value 310 is 'True') or has not been selected (e.g., the 'VM Pool Scaling' value 310 is 'False') to specify whether the VM pool scaling policy 164 (FIGS. 1 and/or 3) is to be applied to the nodes 132-134 (FIG. 1) of the example application 108 (FIG. 1) deployed in the deployment environment 112 (FIG. 1).

At block 406, the example policy handler 154 (FIGS. 1 and/or 3) determines whether the 'VM Pool Scaling Policy' control 202 has been selected. For example, the policy handler 154 may retrieve the 'VM Pool Scaling' value 310 from the blueprint 126. If, at block 406, the example policy handler 154 determines that the 'VM Pool Scaling Policy' control 202 has not been selected (e.g., the 'VM Pool Scaling' value 310 is 'False'), then the example process 400 of FIG. 4 ends.

If, at block 406, the example policy handler 154 determines that the 'VM Pool Scaling Policy' control 202 has been selected (e.g., the 'VM Pool Scaling' value 310 is 'True'), then, at block 408, the policy handler 154 determines whether the application 108 has been deployed in the deployment environment 112. For example, the policy handler 154 may obtain a message from the example deployment director 124 (FIG. 1) when the application 108 is being deployed in the deployment environment 112. If, at block 408, the policy handler 154 determines that the application 108 has not been deployed, control returns to block 408 to determine whether the application 108 has been deployed in the deployment environment 112.

If, at block 408, the example policy handler 154 determines that the application has been deployed (e.g., the policy handler 154 obtains a message from the deployment director 124 indicative of the deployment), then, at block 410, the example policy handler 154 initiates generation of the VM pool 160 (FIG. 1). For example, the policy handler 154 may send a message to the example pool manager 156 (FIGS. 1 and/or 3) to cause the pool manager 156 to generate the VM pool 160. In the illustrated example, the operation of block 410 may be implemented using the process of FIG. 5. The example process 400 of FIG. 4 ends.

In the illustrated example, deployment of the application 108 in the deployment environment 112 triggers the policy handler 154 to initiate generation of the VM pool 160. However, the policy handler 154 may be triggered to initiate generation of the VM pool 160 by other events. For example, the policy handler 154 may initiate generation of the VM pool 160 when the policy handler 154 determines that the 'VM Pool Scaling' value 310 is 'True.' In other examples, the policy handler 154 may initiate generation of the VM pool 160 when the deployment monitor 302 (FIG. 3) initiates the first scaling operation of the nodes 132-134 (FIGS. 1 and/or 2) of the application 108.

Figure 5:
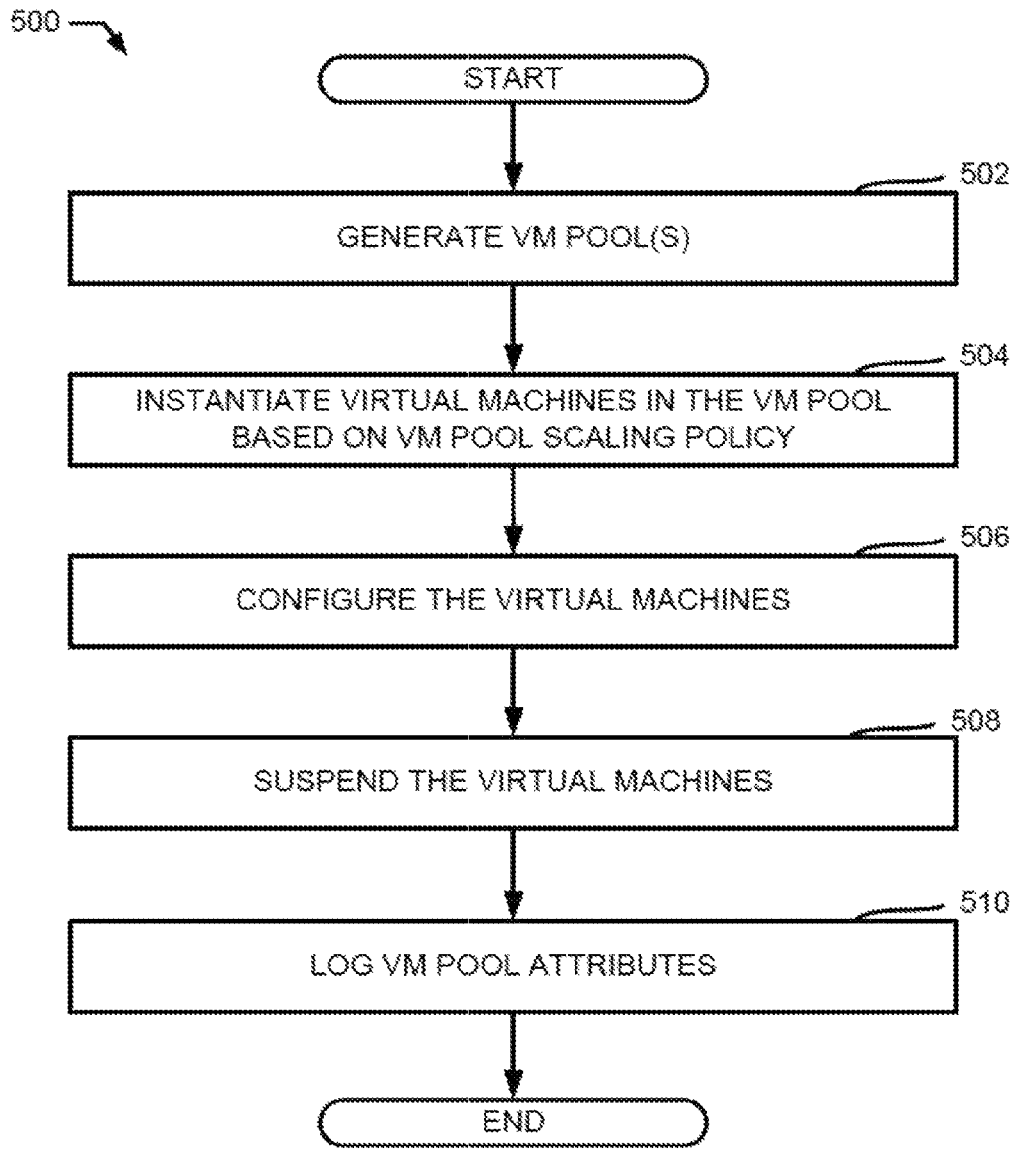

The example program of FIG. 5 prepares the example VM pool 160 (FIG. 1) to enable more efficient scaling operations of the example nodes 132-134 (FIGS. 1 and/or 2) of the example application 108 (FIG. 1). The example program 500 of FIG. 5 may be used to implement block 410 of FIG. 4. The example program 500 of FIG. 5 begins at block 502 when the example pool manager 156 (FIGS. 1 and/or 3) generates one or more VM pools 160. For example, the pool manager 156 may receive a message from the example policy handler 154 (FIGS. 1 and/or 3) to cause the pool manager 156 to generate one or more VM pools 160. The example pool manager 156 may reserve and manage one or more environments provided by the example network virtualization platform 158 (FIG. 1) and designate selected ones of the environments as the generated ones of the VM pools 160. In some examples, the example pool manager 156 may request the example cloud computing platform provider 110 (FIG. 1) to provide one or more environments to the pool manager 156, which allocates the provided pools as the generated ones of the VM pools 160.

At block 504, the example pool manager 156 instantiates the example virtual machines 162 (FIG. 1) in the generated ones of the VM pools 160 based on the example VM pool scaling policy 164 (FIG. 1). In the illustrated example, the pool manager 156 retrieves the VM pool scaling policy 164 from the example catalog 120. However, other repositories may additionally and/or alternatively be used. The VM pool scaling policy 164 may specify that the number of virtual machines 162 instantiated in the generated ones of the VM pools 160 be between a first threshold (e.g., a minimum number of virtual machines) and a second threshold (e.g., a maximum number of virtual machines), may specify how many VM pools 160 to generate, may specify how the virtual machines 162 in the VM pool 160 are to be configured, etc.

At block 506, the example pool manager 156 configures the instantiated virtual machines 162 in accordance with the VM pool scaling policy 164. For example, the VM pool scaling policy 164 may specify different pool types for the generated ones of the VM pools 160. In such instances, the virtual machines 162 are configured based on the specified pool type of the VM pool 160 they were instantiated within. For example, the VM pool scaling policy 164 may specify that virtual machines instantiated within select ones of the VM pools 160 be configured to be general virtual machines (e.g., the pool manager 156 may install the specified guest operating system 140, and may download, install and/or configure the example deployment agent 136 on the instantiated virtual machines 162), and virtual machines instantiated within other ones of the VM pools 160 be configured to be application-level customized virtual machines (e.g., the pool manager 156 may install a specified guest operating system 140, the deployment agent 130, and install one or more application components/nodes in the virtual machines 162 based on the rules specified in the VM pool scaling policy 164).

At block 508, the example pool manager 156 transitions the virtual machines 162 in the generated ones of the VM pools 160 into a suspended-state. For example, the pool manager 156 may disassociate the virtual machines 162 in the generated ones of the VM pools 160 from other network and/or compute resources. For example, while in the suspended-state, the virtual machines 162 may not receive messages (e.g., "pings") and/or be accessed via secure shell server. At block 510, the pool manager 156 logs the attributes of the VIM pools 160, for example, in a data structure such as a lookup table. For example, the pool manager 156 may store configuration information of the virtual machines 162 and the VM pools 160 in the example VM pool attributes table 312 (FIG. 3). For example, the pool manager 156 may store a count of the suspended-state virtual machines 162 in the generated ones or more VM pools 160. The example pool manager 156 may also log (e.g., record) IP addresses (e.g., virtual IP addresses (vIPs)) assigned to the different ones of the virtual machines 162. The example pool manager 156 of the illustrated example stores the VM pool attributes 312 in a data structure in the example VM pool policy database 308. (FIG. 3). The example process 500 of FIG. 5 ends.

Figure 6:
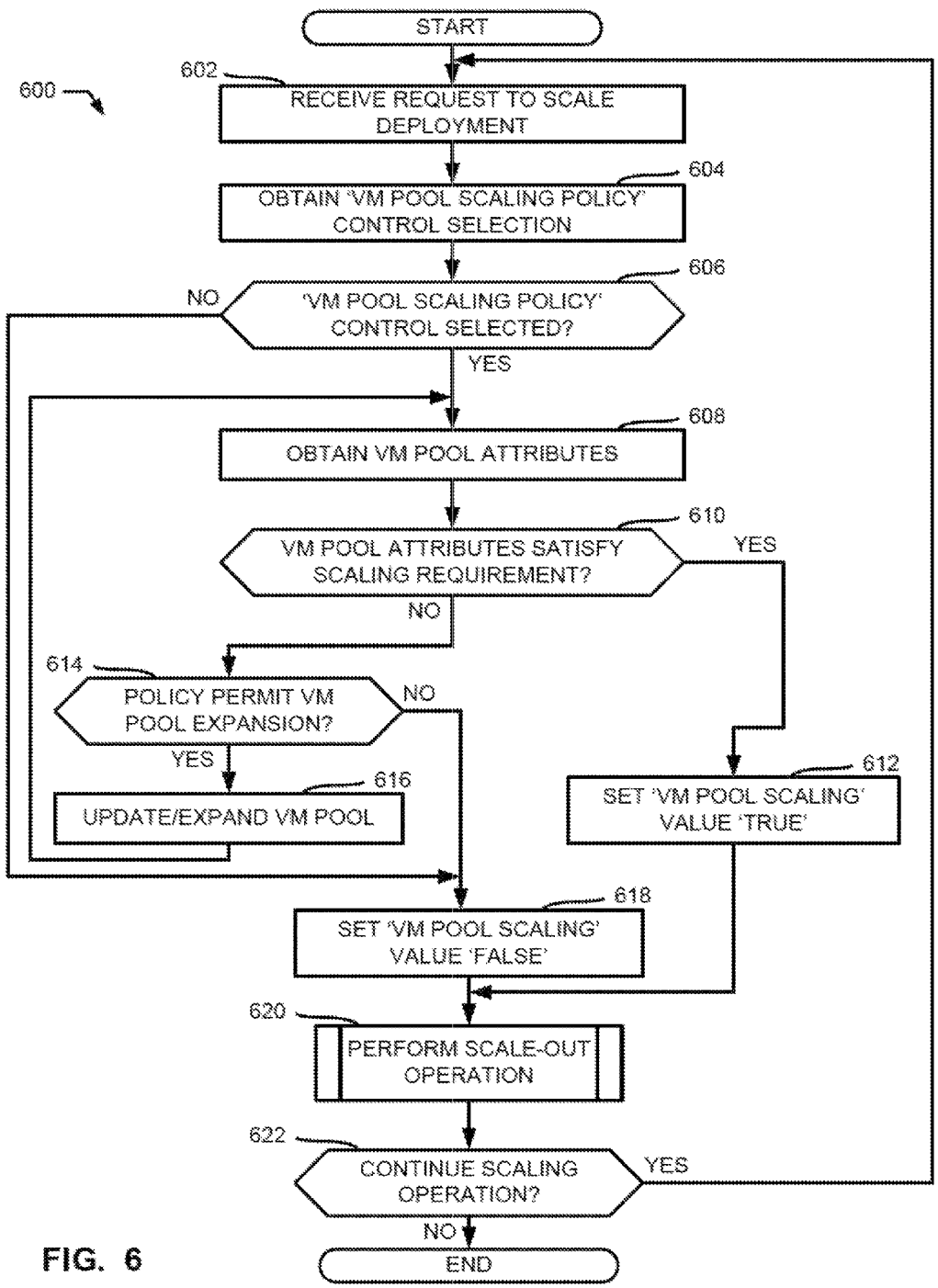

The example program of FIG. 6 begins at block 602 when the example scaling handler 130 (FIGS. 1 and/or 3) receives a request to scale a deployment. For example, the deployment monitor 302 (FIG. 3) may send a message to the example policy handler 154 (FIGS. 1 and/or 3) to scale-out deployment of the application 108 (FIG. 1) in the deployment environment 112 (FIG. 1).

At block 604, the example policy handler 154 obtains the 'VM Pool Scaling Policy' control 202 selection. For example, the policy handler 154 may determine whether the 'VM Pool Scaling Policy' control 202 was selected by a user or not selected by a user from the blueprint 126.

At block 606, the example policy handler 154 determines whether the 'VM Pool Scaling Policy' control 202 was selected. If, at block 606, the example policy handler 154 determines that the 'VM Pool Scaling Policy' control 202 was not selected, control proceeds to block 618 to set the 'VM Pool. Scaling' value 310 to 'False' in the VM pool policy database 308. If, at block 606, the example policy handler 154 determines that the 'VM Pool Scaling Policy' control 202 was selected, then, at block 608, the policy handler 154 obtains the attributes of the VM pools 160. For example, the policy handler 154 may obtain the VM pool attributes table 312 from the VIM pool policy database 308 (FIG. 3). At block 610, the example policy handler 154 determines whether the attributes of the VIM pools 160 satisfy the requirements for performing the scaling operation. For example, if a scale-out operation requires two additional virtual machines, then the policy handler 154 determines whether two virtual machines are available in the VM pools 160. If, at block 610, the policy handler 154 determines that the attributes of the VM pools 160 satisfy the scaling requirements, then, at block 612, the policy handler 154 sets the 'VM Pool Scaling' value 310 to 'True' in the VM pool policy database 308. For example, when the 'VM Pool Scaling' value 310 is set to 'True,' then suspended-state virtual machines 162 may be fetched from one or more VM pools 160 to perform the scale-out operation.

If, at block 610, the example policy handler 154 determines that the attributes of the VM pools 160 do not satisfy the scaling requirements, then, at block 614, the policy handler 154 determines whether the VM pool scaling policy 164 permits VM pool expansion. For example, the VM pool scaling policy 164 may indicate that VM pools are not to be expanded (e.g., increased in size). If, at block 614, the policy handler 154 determines that the VM pool scaling policy 164 does not permit VM pool expansion, control proceeds to block 618 to set the 'VM Pool Scaling' value 310 to 'False' in the VM pool policy database 308. That is, the scale-out operation cannot be performed with suspended-state virtual machines 162 due to, for example, the 'VM Pool Scaling Policy' control 202 not being selected (block 606), or not having adequate resources (e.g., the virtual machines 162) available within the one or more VM pools 160 generated for use during scaling operations. If, at block 614, the policy handler 154 determines that VM pool expansion is permitted, then, at block 616, the policy handler 154 instructs the example pool manager 156 to update/expand the VM pool size, and control returns to block 608 to obtain the attributes of the VM pools 160.

After the policy handler 154 sets the 'VM Pool Scaling' value 310 to 'True' at block 612 or after the policy handler 154 sets the 'VM Pool Scaling' value 310 to 'False' at block 618, then, at block 620, the policy handler 154 initiates the scale-out operation to increase the number of virtual machines in the application 108 deployment. At block 622, the scaling handler 130 determines whether there is another scaling operation to perform. For example, the policy handler 154 may receive a message from the deployment monitor 302. If, at block 622, the scaling handler 130 determines that there is another scaling operation to perform, then, control returns to block 602 to receive the request to scale the application 108 deployment. Otherwise, if, at block 622, the scaling handler 130 determines that there is not another scaling operation to perform, the example process 600 of FIG. 6 ends.

Figure 7:
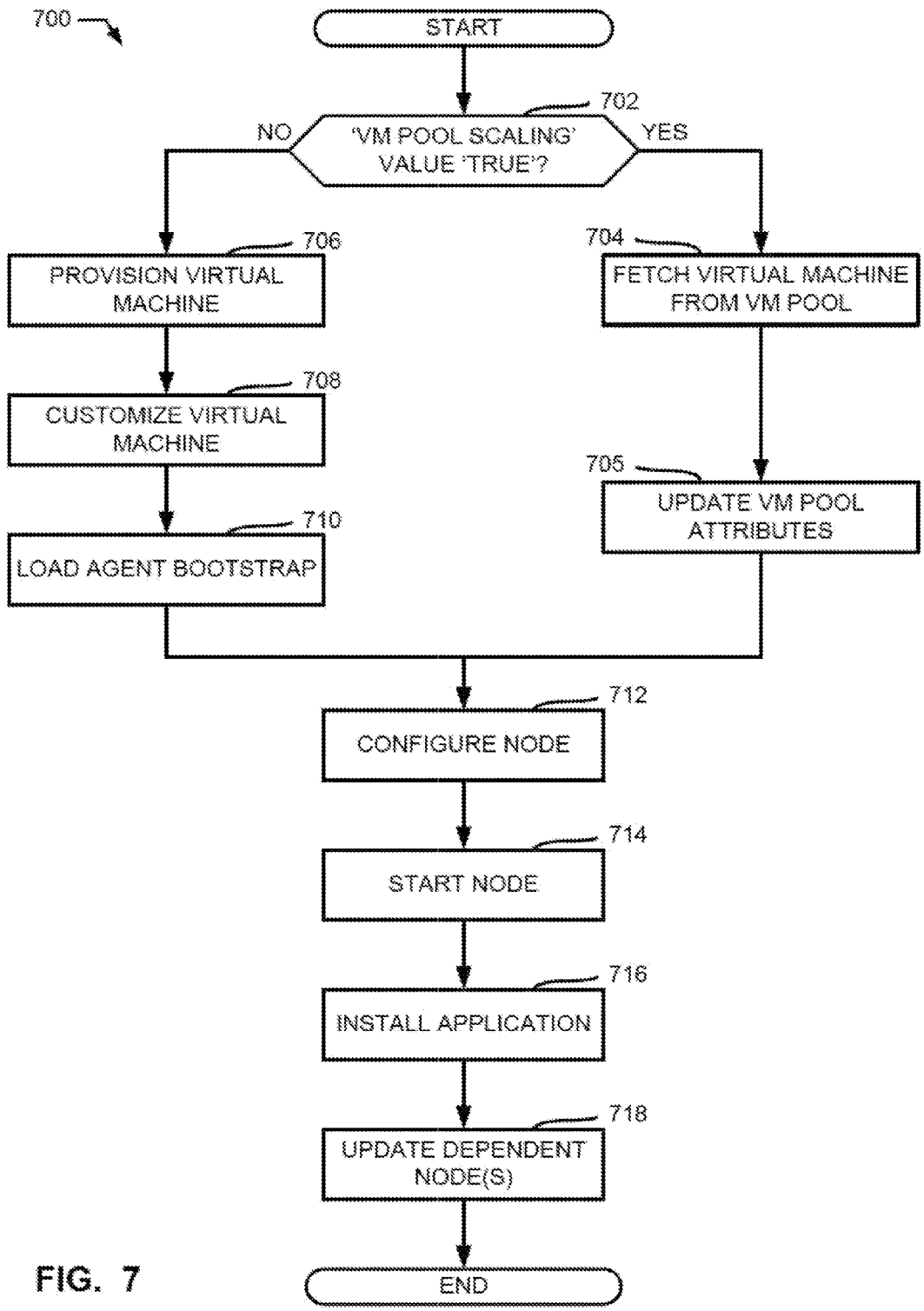

The example program of FIG. 7 performs a scale-out operation using VM pools. The example program 700 of FIG. 7 may be used to implement block 622 of FIG. 6. The example program 700 of FIG. 7 begins at block 702 when the example scaling handler 130 (FIGS. 1 and/or 3) determines whether the 'VM Pool Scaling' value 310 is 'True.' For example, the example scale-out handler 304 (FIG. 3) may obtain the 'VM Pool Scaling' value 310 from the VM pool policy database 308 (FIG. 3). If, at block 702, the 'VM Pool Scaling' value 310 is 'True,' then, at block 704, the example scale-out handler 304 fetches the virtual machines 162 from the VM pools 160 available to the scale-out handler 304. For example, the scale-out handler 304 may request the specified number of suspended-state virtual machines 162 from the pool manager 156. At block 705, the pool manager 156 updates the VM pool attributes table 312 to indicate which suspended-state virtual machines 162 were removed from the VM pools 160. Control then proceeds to block 712 to configure the nodes (e.g., the fetched suspended-state virtual machines 162).

If, at block 702, the 'VM Pool Scaling' value 310 is 'False,' then, at block 706, the scale-out handler 304 provisions virtual machines 114 in the deployment environment 112. At block 708, the example scale-out handler 304 loads an agent bootstrap script. At block 710, the example scale-out handler 304 executes the agent bootstrap script to retrieve the example deployment agent 136 (FIG. 1) from the example deployment director 124 (FIG. 1).

At block 712, the nodes at the provisioned virtual machines 114 (e.g., provisioned with the 'VM Pool Scaling' value 310 was 'False') and/or the fetched virtual machines 162 are configured to execute application services such as application servers, database servers, monitoring services, web servers, messaging services, middleware services, etc. In some examples, the fetched virtual machines 162 may be pre-installed with the application services when they were configured in their respective VM pool 160. At block 714, the node is started (e.g., starts and/or restarts the application service). At block 716, the application component is installed to execute on the node. For example, a banking applications' web application may be installed on an appserver node. At block 718, the scale-out handler 304 updates the dependent nodes. For example, the scale-out handler 304 may provide the load balancer node 132 with the IP addresses of the newly added (e.g., provisioned and/or fetched) virtual machines. The example process of FIG. 7 then ends.

Figure 8:
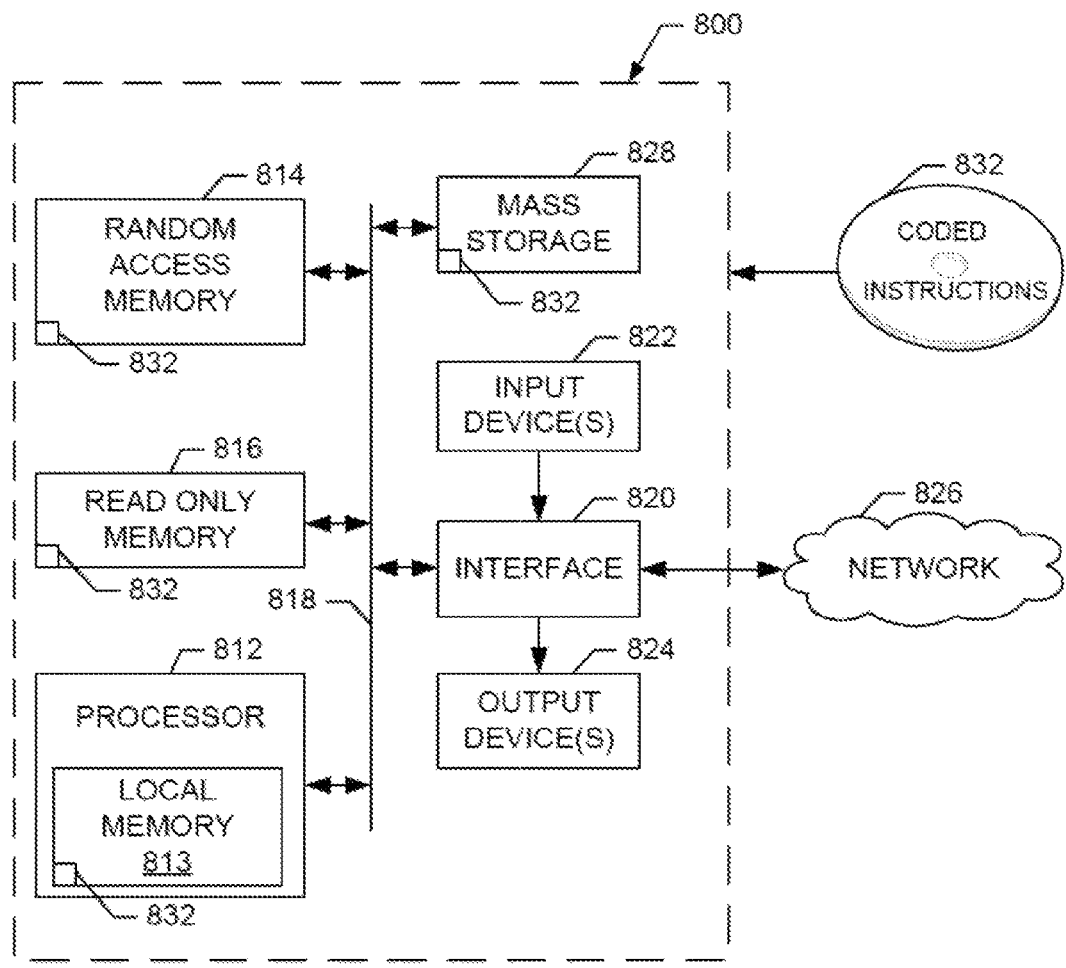
FIG. 8 is a block diagram of an example processing platform capable of executing the example machine readable instructions of FIGS. 4-7 to implement the example application director of FIG. 1 and/or the example scaling handler of FIGS. 1 and 3.

FIG. 8 is a block diagram of an example processor platform 800 capable of executing the instructions of FIGS. 4-7 to implement the scaling handler 130 of FIGS. 1 and 3. The processor platform 800 can be, for example a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Bin-ray disk drives, RAID systems, and digital versatile disk (DVD) drives.

The coded instructions 832 of FIGS. 4-7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture scale application deployments in cloud computing environments, while using virtual machine pools, and, thereby, improving the efficiency with which scaling operations are performed for applications deployed in a deployment environment. Disclosed examples determine whether a virtual machine pool scaling policy is applicable and available for applying to the application deployment, and then enforcing the virtual machine pool scaling policy. Disclosed examples generate virtual machine pools including virtual machines in a suspended-state and, thereby reducing the amount of time needed to prepare a virtual machine in the deployment environment from provisioning, downloading, installing and configuring operating systems, application services and/or application components, to powering-ON the suspended-state virtual machines.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to scale an application, the method comprising:
    displaying a user-selectable control in a user interface, the user-selectable control to specify whether the application is to be scaled in accordance with a scaling policy;
    based on selection of the user-selectable control, storing, in a blueprint of the application, an indication of whether the application is to be scaled in accordance with the scaling policy;
    based on the indication in the blueprint, preparing, by executing an instruction with at least one processor, a virtual machine pool in the computing environment, the virtual machine pool including a first virtual machine provisioned for use in a scaling operation;
    in response to a request to scale the application deployed in a deployment environment, determining, by executing an instruction with the at least one processor, whether configuration information of the virtual machine pool satisfies a scaling requirement included in the request;
    determining, by executing an instruction with the at least one processor, whether the scaling policy permits expanding the virtual machine pool when the configuration information fails to satisfy the scaling requirement;
    instantiating, by executing an instruction with the at least one processor, a second virtual machine in the virtual machine pool when the scaling policy permits expanding the virtual machine pool;
    updating, by executing an instruction with the at least one processor, the configuration information of the virtual machine pool;
    determining, by executing an instruction with the at least one processor, whether the updated configuration information satisfies the scaling requirement; and based on the determination of the updated configuration information, performing, by executing an instruction with the at least one processor, the scaling operation in accordance with the request by transferring the first virtual machine to the deployment environment.

2. A method as defined in claim 1, wherein the virtual machine pool is a collection of virtual machines to be used for scaling operations and configured in accordance with the scaling policy.

3. A method as defined in claim 1, wherein the scaling policy specifies a number of virtual machines to include in the virtual machine pool.

4. A method as defined in claim 1, wherein the preparing of the virtual machine pool includes:
   generating the virtual machine pool;
   instantiating the virtual machine in the virtual machine pool;
   configuring the virtual machine in accordance with the scaling policy; and
   transitioning the virtual machine to a suspended state.

5. A method as defined in claim 1, wherein the generating of the virtual machine pool is in response to preparing the blueprint.

6. A method as defined in claim 1, wherein the generating of the virtual machine pool is in response to deploying the application in the deployment environment.

7. A method as defined in claim 1, wherein the configuration information includes a number of virtual machines included in the virtual machine pool.

8. A method as defined in claim 1, wherein the performing of the scaling operation includes, in response to the determining that the configuration information satisfies the scaling requirement:
   fetching the first virtual machine from the virtual machine pool to the deployment environment; and
   powering-ON the first virtual machine.

9. A method as defined in claim 1, wherein the performing of the scaling operation includes, in response to determining that the configuration information fails to satisfy the scaling requirement:
   provisioning a second virtual machine in the deployment environment;
   customizing the second virtual machine;
   loading a bootstrap script on the second virtual machine; and
   powering-ON the second virtual machine.

10. An apparatus to scale an application, the apparatus comprising:
   a memory including machine readable instructions; and
   a processor to execute the instructions to at least:
      display a user-selectable control in a user interface, the user-selectable control to specify whether the application is to be scaled in accordance with a scaling policy;
      based on selection of the user-selectable control, store, in a blueprint of the application, an indication of whether the application is to be scaled in accordance with the scaling policy;
      based on the indication in the blueprint, prepare a virtual machine pool, the virtual machine pool to include a first virtual machine for use in a scaling operation;
      in response to a request to scale the application deployed in a deployment environment, determine whether configuration information of the virtual machine pool satisfies a scaling requirement included in the request;
      determine whether the scaling policy is to permit expanding the virtual machine pool based on a determination that the configuration information fails to satisfy the scaling requirement;
      instantiate a second virtual machine in the virtual machine pool when the scaling policy is to permit expanding the virtual machine pool;
      update the configuration information of the virtual machine pool;
      determine whether the updated configuration information satisfies the scaling requirement; and
      based on the determination of the updated configuration information, perform the scaling operation in accordance with the request to scale by transferring the first virtual machine to the deployment environment.

11. An apparatus as defined in claim 10, wherein the virtual machine pool is a collection of virtual machines to be used for scaling operations and to be configured in accordance with the scaling policy.

12. An apparatus as defined in claim 10, wherein the scaling policy is to specify a number of virtual machines to include in the virtual machine pool.

13. An apparatus as defined in claim 10, wherein the instructions cause the processor to prepare the virtual machine pool by:
   generating the virtual machine pool;
   instantiating the first virtual machine in the virtual machine pool;
   configuring the first virtual machine in accordance with the scaling policy; and
   transitioning the first virtual machine to a suspended state.

14. An apparatus as defined in claim 10, wherein the instructions cause the processor to generate the virtual machine pool in response to preparing the blueprint.

15. An apparatus as defined in claim 10, wherein the instructions cause the processor to generate the virtual machine pool in response to deploying the application in the deployment environment.

16. An apparatus as defined in claim 10, wherein the configuration information is to include a number of virtual machines included in the virtual machine pool.

17. An apparatus as defined in claim 10, wherein the instructions cause the processor to transfer the virtual machine by:
   fetching the first virtual machine from the virtual machine pool to the deployment environment; and
   powering-ON the first virtual machine.

18. An apparatus as defined in claim 10, wherein, in response to a determination that the configuration information fails to satisfy the scaling requirement, the instructions cause the processor to:
   provision a second virtual machine in the deployment environment;
   customize the second virtual machine;
   load a bootstrap script on the second virtual machine; and
   power-ON the second virtual machine.

19. A tangible computer readable storage medium comprising instructions that, when executed, cause a processor to at least:
   display a user-selectable control in a user interface, the user-selectable control to specify whether an application deployed in a deployment environment is to be scaled in accordance with a scaling policy;
   based on selection of the user-selectable control, store, in a blueprint of the application, an indication of whether the application is to be scaled in accordance with the scaling policy;

based on the indication in the blueprint, prepare a virtual machine pool, the virtual machine pool to include a first virtual machine for use in a scaling operation;

in response to a request to scale the application deployed in the deployment environment, determine whether configuration information of the virtual machine pool satisfies a scaling requirement included in the request;

in response to a determination that the configuration information fails to satisfy the scaling requirement, determine whether the scaling policy permits expanding the virtual machine pool;

instantiate a second virtual machine in the virtual machine pool when the scaling policy permits expanding the virtual machine pool;

update the configuration information of the virtual machine pool;

determine whether the updated configuration information satisfies the scaling requirement; and based on the determination of the updated configuration information, perform the scaling operation in accordance with the request to scale by transferring the first virtual machine to the deployment environment.

20. A tangible computer readable storage medium as defined in claim 19, wherein the virtual machine pool is a collection of virtual machines to be used for scaling operations and to be configured in accordance with the scaling policy.

21. A tangible computer readable storage medium as defined in claim 19, wherein the scaling policy is to specify a number of virtual machines to include in the virtual machine pool.

22. A tangible computer readable storage medium as defined in claim 19, wherein the instructions cause the processor to prepare the virtual machine pool by:

generating the virtual machine pool;
instantiating the first virtual machine in the virtual machine pool;
configuring the first virtual machine in accordance with the scaling policy; and
transitioning the first virtual machine to a suspended state.

23. A tangible computer readable storage medium as defined in claim 19, wherein the instructions cause the processor to generate the virtual machine pool in response to preparing the blueprint.

24. A tangible computer readable storage medium as defined in claim 19, wherein the instructions cause the processor to generate the virtual machine pool in response to deploying the application in the deployment environment.

25. A tangible computer readable storage medium as defined in claim 19, wherein the configuration information is to include a number of virtual machines included in the virtual machine pool.

26. A tangible computer readable storage medium as defined in claim 19, wherein the instructions cause the processor to transfer the first virtual machine by:

fetching the first virtual machine from the virtual machine pool to the deployment environment; and
powering-ON the first virtual machine.

27. A tangible computer readable storage medium as defined in claim 19, wherein, in response to a determination that the configuration information fails to satisfy the scaling requirement, the instructions cause the processor to:

provision a second virtual machine in the deployment environment;
customize the second virtual machine;
load a bootstrap script on the second virtual machine; and
power-ON the second virtual machine.

* * * * *